Patented Sept. 27, 1938

2,131,431

UNITED STATES PATENT OFFICE 2,131,431

FREE-MIXING FINELY DIVIDED MATERIAL AND METHOD OF INHIBITING ITS NORMAL FLOCCULATION OR COHESION

Augustus H. Fiske, Warren, R. I., assignor to Rumford Chemical Works, Rumford, R. I., a corporation of Rhode Island No Drawing. Application July 31, 1937, Serial No. 156,809

5 Claims. (Cl. 23—239)

This invention relates to the preservation or provision of free-mixing and non-caking properties in pulverulent materials which are normally coherent or cake under certain conditions in their manufacture, distribution, use or sale.

It is well known that certain materials, such as salt, sugar, cement, ground pigments, flake or powdered soaps, and the like, have a tendency to cohere or floc, become lumpy, and eventually cake to a hard or relatively hard condition. This may occur when the comminuted material is packed in a mass or in a container for any considerable length of time, whether or not subjected to pressure. It is well known that the subjection of certain materials of this nature to pressure in the mass tends to increase the tendency to cohere, lump or cake. A time element is also involved, the lumping or caking tendency increasing or becoming more advanced with time. Some materials take a longer time than others to develop the coherent, lumpy or caked condition.

My experiments indicate that certain fine powders, granular or flaky particles, or mixtures of the same, as well as mixtures of fine and coarser particles, similarly show lumping, caking or flocculating tendencies. My observations indicate that crystalline forms increase the tendency of such materials to cake. The presence of clean cut or broken crystal surfaces seem to make a material cake as well as reduce its freedom of flow.

As far as the range of room temperatures are concerned, this tendency to lump or cake apparently is not affected by temperature. The presence of traces of moisture has a distinct tendency to increase lumping or caking. Humidity of the atmosphere and the tendency of substances to effloresce or deliquesce may cause caking but these may be prevented by controlling the surrounding conditions. Apparently each material has its own individual characteristics which may offset or impart the tendency of its particles to cohere.

Heretofore, the method commonly employed to prevent lumping and caking in commercial pulverulent materials in non-airtight packages has been to add to the material one or two percent of an inert harmless substance. For instance, powdered sugar is mixed with one or two percent of dry starch which tends to prevent caking. Sodium chloride, or salt, is mixed with one per cent of powdered neutral calcium phosphate or precipitated chalk for a like reason. But these remedies are unsatisfactory because they contaminate the materials with foreign substances, and also the substances added are an extra expense which either increases the cost of the article to the consumer or has to be assumed by the manufacturer.

It is recognized that granular products are less likely to cohere than pulverulent or dusty particles, but under certain conditions and pressures granules become coherent and ultimately lump and cake in much the same way as do pulverulent materials. It is, however, much more expensive and difficult to prepare cohesive substances in the form of granules or globular particles than in the form of powder or dust. My present invention imparts the same or improved non-lumping or non-caking properties to pulverulent materials or flakes or even dust as may be present in granular or hollow globular particles. It also materially improves and ensures the retention of the free-mixing property of such granular or globular particles.

As indicated above, the tendency of most naturally cohesive substances to lump and cake is greatly increased by pressure. For example, if powdered sodium aluminum sulphate is packed in a commercial bag to a weight of 150 pounds and stored in a warehouse for more than a month, it will become rock-like. If stored in a barrel or other rigid container so that it remains loose and is not subjected to pressure as in the bag, it will remain pulverulent for a much longer period. One of the practical advantages of my invention is that it permits manufacturers to pack in bags which are currently the cheapest form of pack available.

According to my present invention the inherent tendency of normally cohering or flocculating substances to lump and cake is overcome by inducing upon the particles of the comminuted material a static charge of electricity of like sign. The phenomenon that substances containing like charge repel each other while those of unlike charge attract each other is familiar. In my present invention I utilize this principle. My research indicates that after the materials have been so charged they may be mixed together and packed in bags or other packages without tendency to mutual coherence or cohesion.

In my experiments I have found that a definite indicated and established electrostatic condition of like sign upon and into finely pulverulent or granular or other comminuted materials has a definite effect on the after behaviour of that aggregate, particularly in so far as its tendency to cohere, lump or cake is involved, and renders the same non-caking and free-mixing.

In the course of my experiments, the charged material was subjected in one instance to a pressure of about one pound per square inch, allowed to stand under this pressure for thirty days, and the material was found not to have caked but to be free-mixing. Similar material not treated but subjected to the same pressure was found to be lumpy and in some cases caked to a hard brick.

In a barrel of granulated sugar, for instance, I have determined that under commercial conditions a cubic inch at the bottom is compressed three-fourths pound per square inch by the weight of the sugar above it. From similar tests I have determined that in a bag of sodium aluminum sulphate (burnt soda alum)

$$Na_2Al_2(SO_4)_4,$$

with another on top of it, the bottom material in the lower bag is subjected to a weight of a fraction over three-fourths pound per square inch by the material above it, and is frequently found to be brick hard. The same materials in my experiments were subjected to seven-eighths pound per square inch, which is slightly more than the usual compression commonly obtained in commercial practices and within the range of possibility of treatment of the material in commercial use, and the treated materials were soft and without lumps.

To place my invention or discovery in the art, I will now describe the procedure employed in my research. It will be understood, however, that this is in no way intended to limit my invention or to indicate the preferred method of practicing the same as I am aware that electric charges may be induced upon the particles by a great variety of methods and means, many of which are already indicated in the art.

In the simple practice of my experiments, a frictional electrical machine of usual so-called Wimshurst type was used as conveniently available. This machine had two glass discs which revolved in opposite directions. The glass discs had contacts fastened to them and the collectors were brushes arranged on opposite sides of the glass discs at suitable points. Attached to each side were Leyden jars. These Leyden jars were to give capacity to the charge and were arranged so that they might be eliminated if desired by raising contacts which threw them out of the circuit.

My invention contemplates the imposition of either a positive or negative charge upon or into the pulverulent material, but in the course of my experiments I found the positive or "plus" charge usually more efficient. In the experiments, the material to be given such a charge was hung in a metal receptacle by a metal bail to the positive pole of the machine, the other pole being grounded. Then the machine was operated for one minute for about 450 turns of the discs. The material was then emptied into receptacles, paper bags being used, and placed in a suitable apparatus to apply pressure by known weight for a given length of time.

When the Leyden jars were in the circuit there were heavy sparks across the one-quarter inch gap at the rate of about 100 per minute. When the Leyden jars were cut out, the sparks were continuous across the gap. I found in my experiments that there was a marked difference between the material treated when the machine was sparking continuously and when it was sparking intermittently at the 100 per minute rate. The materials treated by the machine when continuously sparking gave marked non-caking properties, while those treated when the machine sparked intermittently showed no improvement.

On a basis of the spark gap and the use of uniform electrodes, it has been found that under standard conditions of humidity, temperature and pressure, the resistance curve per unit of the ratio of length of gap to voltage is a flat parabola with certain irregularities in it, but at the limits around a spark gap of one-fourth of an inch, the graph may be represented by a nearly straight line with the mathematical formula Y equals 32,260 where Y equals volts and X equals gap in centimeters. On this basis, the one-fourth inch spark gap gives an approximate resistance of 20,000 volts.

On the above basis, the powder has been charged in a field of 20,000 volts statically. The repulsion between the particles of the powder which are all charged electrically with a positive or plus charge, is in inverse ratio of the squares of the distances between the particles (Ganot's Physics, 1910 ed., p. 787) and the distance remaining the same between the individual particles, the repulsion of one to the other is directly as the product of the quantities of electricity with which the particles are charged. Being charged with electricity of the same sign or character, the particles repel each other.

The following results were obtained on various substances in this field of 20,000 volts intensity which I have described, and they may be multiplied indefinitely. Obviously higher voltages may be used, the limit being the breaking down of the insulation of the unit. I give the following as specimens and illustrations:

*Sodium chloride—granular*

Untreated_____ Caked and lumpy.
Treated—intermittent spark_ Caked and lumpy.
Treated—continuous_____ Soft and free mixing.

*Sodium aluminum sulphate—powdered*

Untreated_____ Caked brick hard.
Treated—intermittent spark_ Caked brick hard.
Treated—continuous_____ Soft and powdery.

*Bicarbonate of soda—powdered*

Untreated_____ Caked and lumpy.
Treated—intermittent spark_ Lumpy.
Treated—continuous_____ Soft and powdery, no lumps.

Thus, where the material has been treated, as compared with the same material not treated, and after standing under the above described conditions, namely, under a pressure of ⅞ pound per square inch for thirty days, we see that a great improvement in the physical condition of the powdered materials has taken place, the cohesive, lumping and caking tendencies apparently being replaced by a soft powdery free-mixing property. According to my observations, this condition is still present after a lapse of three months.

As electricity is a surface phenomenon and the quantity of electricity which can be accumulated is proportional to the difference in potential and to the available surface, we can see that the very large surface involved in the finely powdered materials which I have tested enabled me to obtain a comparatively large quantity of electrical absorption in my material. In my experiments, the spark gap which was a rough measure of the potential remained at one-fourth inch between the electrodes which were round balls about one centimeter in diameter.

It will be understood that any apparatus which will give a high undirectional electrical potential may be used in place of the apparatus above described, for example, a spark coil, transformer, or any apparatus which will raise the voltage to the height desired. The material may be temporarily placed within or slowly carried along a predetermined path adjacent which are discharged a plurality of point discharges creating a static atmospheric charge which is taken up by the traveling particles.

According to my theory, the caking of a material is in the nature of a gelation or regelation, and the molecules of a solid are held together by an electrical attraction. I suggest that the electrical charge of like sign which I give to the pulverulent cohesive particles makes each particle repel each physically adjacent particle in the mass. This I believe is possible because each particle is surrounded by an electrical envelope or ionized atmosphere of repulsion which prevents it from contacting the adjacent particles. These mutually repellent particles will not combine and the process of fusion or regelation will not take place between them within the limits of probable commercial pressures liable to be exerted on the particles and which will not be likely to be in excess of the pressures employed in my experiments.

The utility of my invention is very great. At present a commercial material, such as sodium aluminum sulphate, has to be stored in barrels if it is to be held any length of time. Otherwise it will cake. Bags are much cheaper than barrels, and therefore it would be more desirable to hold it in bags. Large bags of sugar are not usually over 100 pounds because sugar will cake if held in larger amounts in bags. When keeping pulverulent materials in bins, some cake and are hard to dig out. Even when packed in relatively small paper or other cartons or in metallic containers, the tendency to lump persists in many materials. By my present invention all these objectionable characteristics are overcome and the normal lumpy material is rendered free-mixing while the tendency of such materials to cake under pressure or long standing is either greatly minimized or entirely overcome.

In the case of certain materials, such as powdered soap, a tendency to lump in the package exists. In others a tendency to run together and lump becomes apparent when subjected to water. When treated in accordance with my process, not only is any lumping in the package avoided, but on being poured from the package the particles tend to disperse either while being shaken into water or within a container before water is added so that the tendency of the same to run together when wetted is largely overcome.

What I therefore claim and desire to secure by Letters Patent is:

1. A method of preparing for sale a finely divided normally coherent material consisting in charging the particles thereof with electricity of one sign only, and packing the charged material in a compressible container.

2. A new article of commerce comprising a compressible container and enclosed therein a body of finely divided particles of normally coherent material carrying electric charges of one sign only which render the particles mutually repellent and thereby inhibit their normal tendency to cohere.

3. The method of treating a finely divided normally coherent material to prevent lumping or caking thereof which comprises charging the particles thereof with electricity of one sign only, and then storing said material under conditions that would normally cause coherence thereof.

4. The method of treating a finely divided normally coherent material to prevent lumping or caking thereof which comprises applying a continuous electrostatic charge of one sign only to the particles thereof, and then storing the material under conditions that would normally cause coherence thereof.

5. A new article of commerce comprising a container and enclosed therein a body of finely divided normally coherent material the particles of which carry an electric charge of one sign only in amount ample to render them mutually repellent to an extent to inhibit their coherence under conditions which normally would result in their coherence.

AUGUSTUS H. FISKE.